United States Patent
Chen et al.

(10) Patent No.: US 8,296,379 B2
(45) Date of Patent: Oct. 23, 2012

(54) HANDLING MEETING INVITATIONS AND CALENDAR SYSTEM

(75) Inventors: Li-Ju Chen, Taipei (TW); Si Bin Fan, Beijing (CN); Yue Ma, Beijing (CN); Xiang Qian, Beijing (CN); Dan Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 12/749,069

(22) Filed: Mar. 29, 2010

(65) Prior Publication Data

US 2010/0250690 A1   Sep. 30, 2010

(30) Foreign Application Priority Data

Mar. 31, 2009  (CN) .......................... 2009 1 0130691

(51) Int. Cl.
*G06F 15/16* (2006.01)
(52) U.S. Cl. ......... 709/206; 709/204; 709/205; 709/207
(58) Field of Classification Search .................. 709/204, 709/205, 206, 207
See application file for complete search history.

(56) References Cited

U.S. PATENT DOCUMENTS

| | | | |
|---|---|---|---|
| 2005/0033615 A1* | 2/2005 | Nguyen et al. ................. | 705/5 |
| 2006/0031349 A1* | 2/2006 | Bailey et al. .................. | 709/206 |
| 2007/0005408 A1 | 1/2007 | Boss et al. | |
| 2007/0143399 A1* | 6/2007 | Qi .................. | 709/204 |
| 2008/0120383 A1* | 5/2008 | Kumar et al. .................. | 709/206 |
| 2008/0140488 A1* | 6/2008 | Oral et al. .......... | 705/8 |
| 2008/0215348 A1* | 9/2008 | Guldimann et al. ............. | 705/1 |
| 2008/0215426 A1* | 9/2008 | Guldimann et al. ............ | 705/14 |
| 2009/0106373 A1* | 4/2009 | Schmidt-Karaca et al. .. | 709/206 |
| 2009/0125817 A1* | 5/2009 | O'Sullivan et al. ........... | 715/753 |
| 2010/0005142 A1* | 1/2010 | Xiao et al. .................... | 709/204 |

OTHER PUBLICATIONS

Information Services—Lotus Notes Team, "Lotus Notes—Think Outside the Inbox", University of Nebraska, Lincoln, HTTP://NOTES.UNL.EDU.NEWNOTES2/CALENDARPREFS/SHTML.
Brent, K. et al., "IBM Lotus Notes and Domino 8 Reviewer's Guide", Dec. 2007.

\* cited by examiner

*Primary Examiner* — Liangche A Wang
(74) *Attorney, Agent, or Firm* — A. Bruce Clay

(57) ABSTRACT

A calendar system handles meeting invitations. Associated entries are determined in a received meeting invitation of a calendar system. A forwarded invitation is generated according to the associated entries. An association is generated between the forwarded invitation and the meeting invitation. The forwarded invitation is then sent. In this way, the calendar distributes meeting arrangements relatively independently, so that meeting invitations and forwarded invitations can be managed relatively independently.

6 Claims, 6 Drawing Sheets

Continued from Fig. 3a

| Subject 1 | Discussion of project A | | Initiator | Manager in America |
|---|---|---|---|---|

Time:
- Start: Fri 07/04/2008 01:00
- End: Fri 07/04/2008 03:00  2hours
- ☐ Determine the time zone
- ☐ Repeat Location:
- Place
- Room    54972
- Resources
- Online    ☐ Online meeting Participants:
- Compulsory participants (to): Manager in China, Manager in UK
- Non-compulsory participants (cc)
- Reference (bcc)

Category

Description

Every manager, please send me the speech draft to me before the meeting

| Name of sub-project | Time |
|---|---|
| MB | 1:00 - 1:50 |
| CPE | 2:00 - 2:30 |
| LCM | 2:30 - 3:00 |

Fig. 3b

HANDLING MEETING INVITATIONS AND CALENDAR SYSTEM

BACKGROUND

The present invention relates to a method for handling information in a calendar system, and particularly to a method for handling meeting invitations and a calendar system.

In the business field, organizing and participating in meetings is common. A calendar system, which is usually used with emails, provides a convenient mechanism for the organization and arrangement of a meeting. If there are many variations in meeting arrangements or activities in the workplace, one may worry about conflicts among meeting arrangements or forgetting one of them, he can use a calendar system to arrange and remember them. In a calendar system, it is possible to display arrangements for activities, such as meetings, in order of time, and remind the user of participating at a specified time.

Calendar systems provide mechanisms for viewing, setting, and modifying meeting arrangements. For example, the manner of viewing meeting arrangements is very flexible. The meeting arrangements in a calendar system can be viewed by "day", "workweek", or month. If one wants to check meetings or activities in some time period, he only needs to select the corresponding date in the "calendar" navigation pane, and then the corresponding calendar will be displayed in the window, in which labels with different colors may be used to indicate the nature and importance of the meeting or activity. In the calendar system, a user can also input and view details of some activities, or search the calendar for an activity such as a meeting with a "find" function.

The calendar system also provides the function of inviting participants of a meeting by determining the "start time" and "end time" of a meeting and inviting others to participating in it. In the calendar system, one can click a "recipient" button to open a dialog, in which contacts in an address book can be searched for, or in which their email addresses can be input directly. When finished, the meeting invitation can be sent to the specified recipients. Also, a meeting reminder can be set in the calendar system, in order to remind the user of activities about to occur in specified times.

A meeting arrangement already placed in the calendar system can also be modified, and the modified update information can be sent to the meeting participants. The modification can be changes in the meeting time, content, location, or participants. If only the time or date of the meeting arrangement needs to be modified, the following method can generally be used: displaying in the window the label of time to be modified; and directing the cursor to the label for setting time or date; then the label can be moved up, down, left, or right. Moving the cursor up or down advances or postpones the start time of the meeting, respectively. For the date, moving the cursor left or right advances or postpones the start time of the meeting one day or several days, respectively. A meeting arrangement already placed in the calendar system can also be deleted.

Therefore, although existing calendar systems provide conveniences, there are still deficiencies to be improved in how to efficiently handle meeting arrangements under complex circumstances.

BRIEF SUMMARY

The present invention provides a method for handling meeting invitations in a calendar system. Associated entries are determined in a meeting invitation received in a calendar system. A forwarded invitation according to the associated entries is generated. An association is generated between the forwarded invitation and the meeting invitation. The forwarded invitation is sent.

The present invention also provides a calendar system. An associated entry determiner determines associated entries in a meeting invitation received in the calendar system. A forwarded invitation generator generates a forwarded invitation according to the associated entries in order to forward the meeting invitation. An associator generates an association between the forwarded invitation and the meeting invitation. A sender sends the forwarded invitation.

The present invention also provides a computer program product for handling meeting invitations in a calendar system. Computer readable program code is configured to determine associated entries in a meeting invitation received in a calendar system. Computer readable program code configured to generate a forwarded invitation according to the associated entries. Computer readable program code is configured to generate an association between the forwarded invitation and the meeting invitation, and the forwarded invitation is sent.

BRIEF DESCRIPTION OF THE SEVERAL VIEWS OF THE DRAWINGS

FIGS. 3a and 3b illustrate the user interface of a forwarded invitation according to another embodiment of the present invention;

DETAILED DESCRIPTION

Figure 1:
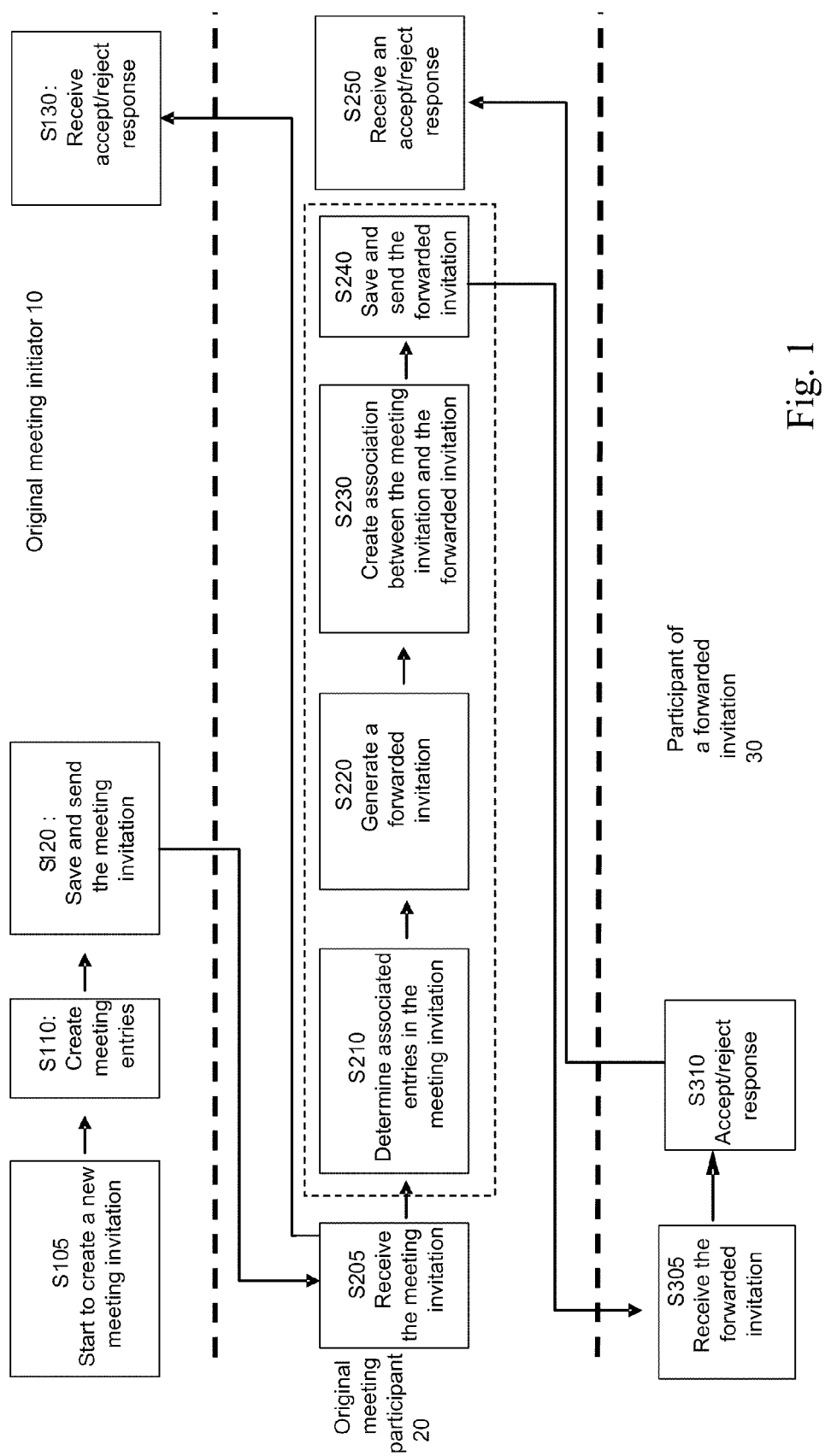
FIG. 1 illustrates a flowchart of forwarding a meeting invitation according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer-usable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that can contain, store, communicate, propagate, or transport a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and/or partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates a flowchart of forwarding a meeting invitation according to an embodiment of the present invention. In FIG. 1, there is shown a calendar flow among an original meeting initiator 10, an original meeting participant 20, and a participant 30 of a forwarded invitation. In the flow, Steps S105-S120 are performed in the calendar system of the original meeting initiator 10; Steps S205-S250 are performed in the calendar system of the original meeting participant 20; and Steps S305-S310 are performed in the calendar system of the participant 30 of the forwarded invitation.

In order to organize a discussion meeting for a project A, at Step S105, the original meeting initiator 10 creates a new meeting invitation in his calendar system. The calendar system can generate a meeting invitation document identifier (MESSAGEID) to a unique identifier of the meeting invitation document (or the meeting invitation message) in the calendar system. Moreover, the calendar system can also generate a meeting identifier (APPTUUID or MEETINGID) for the meeting invitation, for uniquely identifying the meeting in the calendar system. For example, if a user creates a meeting invitation to organize a discussion meeting for a project A, the calendar system can generate MESSAGEID=1, APPTUUID=1, wherein MESSAGEID=1 uniquely identifies the meeting invitation document (or message), and APPT-UUID=1 is for uniquely identifying the discussion meeting of the project A. Then, based on a change of actual circumstances, the user re-creates an update arrangement of the discussion meeting of the project A, and the calendar system will generate MESSAGE=2, APPTUUID=1, wherein MESSAGE=2 is for uniquely identifying the update arrangement document (or message), and APPTUUID=1 is for identifying that the updating is made to a discussion meeting of the project A with APPTUUID=1.

At Step S110, meeting entries are created for the meeting invitation. The meeting entries may comprise: meeting subject (SUBJECT), meeting initiator (CHAIR), compulsory meeting participant (SENDTO), non-compulsory meeting participant (COPYTO), meeting location (LOCATION), meeting start date (STARTDATE), meeting start time (STARTTIME), meeting end date (ENDDATE), meeting end time (ENDTIME), meeting content (BODY), etc. The meeting subject may be "review for project A." The meeting agenda, telephone number for participating in the meeting and the corresponding password, discussion content, etc. can be input into the meeting content entry (BODY). After completing the contents of the meeting invitation entries, at Step S120, the meeting invitation is saved and sent to the compulsory meeting participants (SENDTO) and the non-compulsory meeting participants (COPYTO).

The original meeting participant 20 may be one of the one or more compulsory meeting participants (SENDTO) and/or the one or more non-compulsory meeting participants (COPYTO). In the calendar system of the original meeting participant 20, at Step 205, the above meeting invitation is received. After reading the meeting invitation, the original meeting participant 20 wants to invite others to participate in the meeting as well. According to an embodiment of the present invention, the user can selectively forward with his calendar system the meeting invitation as a new meeting invitation, i.e. generates a forwarded invitation. At Step S210, associated entries in the meeting invitation are determined, i.e. for the meeting invitation received in the calendar system, the associated entries therein are determined to further generate a forwarded invitation. It is possible to predetermine default associated entries for a forwarded invitation in the calendar system of the original meeting participant 20 during the design or installation of the calendar system. It is also possible to predetermine in the calendar system the default associated entries by the user. In this way, the calendar system can invoke these default associated entries, and determine specific associated entries in the meeting invitation. It is also possible, for a specific meeting invitation, to determine specific associated entries in the above meeting invitation by the user through a user interface, as described herein.

At Step S220, the forwarded invitation is generated according to the associated entries. It is possible to copy the associated entries in the above meeting invitation to the corresponding entries in the above forwarded invitation, and append new entry contents. In this way, at least part of the entries in the forwarded invitation can be originated from the entries of the meeting invitation, while at least part of entries in the forwarded invitation can be independent of the entries of the meeting invitation. Optionally, the contents of the entries of the forwarded invitation originated from the entries of the meeting invitation may at least comprise the contents of an entry of the meeting invitation and additional contents, wherein, the additional contents, as compared with the contents copied from the meeting invitation, refer to contents inputted by the original meeting participant for generating the forwarded invitation, that is, additional contents appended to entries in the forwarded invitation for generating the forwarded invitation.

In the user interface of the calendar system of the original meeting participant 20, the entries of the meeting invitation can be provided, so that the user can select at least part of the entries as the associated entries for the forwarded invitation. Generating the forwarded invitation may copy the associated entries of the meeting invitation to the forwarded invitation, and further set additional contents in the forwarded invitation. In this way, the forwarded invitation comprises the selected contents in the meeting invitation, can be further set as described herein, and be updated correspondingly according to an update to the meeting invitation. The contents not included in the meeting invitation, such as the additional contents, can be further managed independent of the meeting invitation.

Optionally, it is possible to take part or all of the contents of the meeting invitation as the associated entries of the meeting contents of the forwarded invitation, and append it to the meeting contents part of the forwarded invitation, and mark this part as forwarded by the original meeting participant 20. At Step S230, the association between the forwarded invitation and the meeting invitation is generated. Optionally, it is possible to generate the association between the forwarded invitation and the meeting invitation in response to generating the forwarded invitation.

Generating the association between the forwarded invitation and the meeting invitation may be further configured to associate the forwarded invitation document identifier with the meeting invitation document identifier, and associate the entries in the forwarded invitation originated from the entries of the meeting invitation with the corresponding entries in the meeting invitation. It is also possible to associate the meeting contents part of the forwarded invitation with the original meeting invitation, so that this part is updated when the original meeting invitation is updated.

After completing the settings of the forwarded invitation, at Step S240, the forwarded invitation is saved and sent to the compulsory and non-compulsory participants set therein. Furthermore, a participant of the forwarded invitation 30 can generate a re-forwarded invitation for the forwarded invitation received in his calendar system, in order to re-forward the forwarded invitation. This can comprise generating the association between the re-forwarded invitation and the forwarded invitation; and sending the re-forwarded invitation.

According to another embodiment of the present invention, there is no necessary sequence among Steps S210, S220 and S230. The result of performing the three steps is to generate a forwarded invitation associated with the original meeting invitation. For example, it is possible to, in response to the user selecting to forward a meeting invitation, determine the associated entries therein, generate the association between the forwarded invitation and the meeting invitation, and then complete the generation of the forwarded invitation. It is also possible to predetermine the associated entries for generating a forwarded invitation in the calendar system, then generate the forwarded invitation according to the associated entries, and finally, after generating the forwarded invitation, further generate the association between the forwarded invitation and the meeting invitation according to the above generation process. It is also possible to predetermine the association between the forwarded invitation to be generated and the original meeting invitation, then determine the associated entries in the original meeting invitation according to the association, and finally generate the forwarded invitation. The result of performing the three steps is generating a forwarded invitation associated with the original meeting invitation. In this way, an update to the forwarded invitation can be generated in response to the update to the original meeting invitation according to the association.

According to a further embodiment of the present invention, the forwarded invitation can also be sent to the sender of the meeting invitation, in order to update the meeting invitation according to the forwarded invitation. In this way, the organizer of the original meeting invitation can be informed of the participation or preparation status of the meeting.

Figure 2:
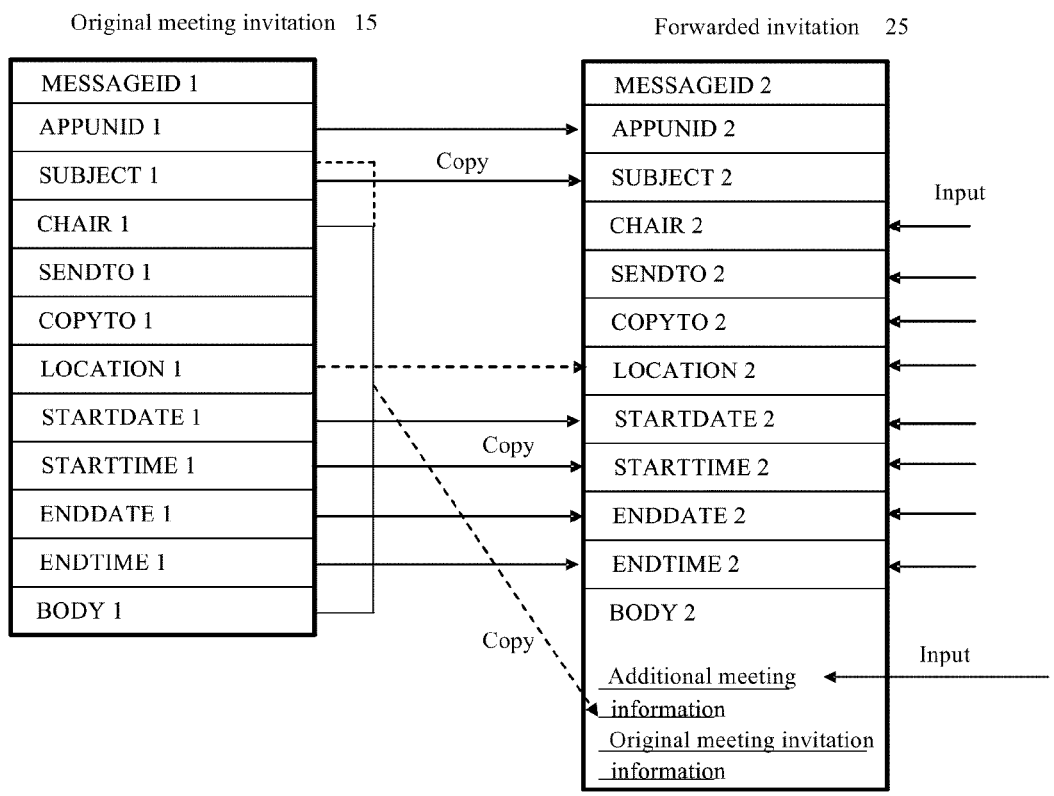
FIG. 2 illustrates a schematic diagram of generating a forwarded invitation and its association according to another embodiment of the present invention.

FIG. 2 illustrates a schematic diagram of generating a forwarded invitation and its association according to another embodiment of the present invention. In FIG. 2, for an original meeting invitation 15 received in a calendar system, a forwarded invitation 25 can be generated in order to forward the meeting invitation. The forwarded invitation 25 can be further associated with the meeting invitation 15, in order to update the forwarded invitation correspondingly in response to the update to the above meeting invitation. For example, in response to the original meeting initiator 10 in FIG. 1 sending an update to the meeting invitation, or in response to the original meeting participant 20 receiving the update to the meeting invitation, an update to the forwarded invitation is generated according to the association between the forwarded invitation and the meeting invitation, and the update to the forwarded invitation is sent. When generating the forwarded invitation, the calendar system may generate a forwarded invitation document identifier (MESSAGEID 2) as a unique identifier of the forwarded invitation in the calendar system.

According to an embodiment of the present invention, for an original meeting invitation 15 received in a calendar system, the associated entries therein can be determined to further generate the forwarded invitation 25. The determined associated entries in the original meeting invitation 15 may comprise the meeting identifier APPTUUID 1, meeting subject SUBJECT 1, meeting location LOCATION 1, meeting start date STARTDATE 1, meeting start time STARTTIME 1, meeting end date ENDDATE 1, meeting end time ENDTIME 1, etc. In this way, when generating the forwarded invitation 25, the associated entries of the above meeting invitation may be copied to the corresponding entries in the forwarded invitation 25. For example, the meeting identifier APPTUUID 1 of the original meeting invitation 15 is copied to the meeting identifier APPTUUID 2 of the forwarded invitation 25, the meeting subject SUBJECT 1 of the original meeting invitation 15 is copied to the meeting subject SUBJECT 2 of the forwarded invitation 25. The meeting location LOCATION 2, meeting start date STARTDATE 2, meeting start time STARTTIME 2, meeting end date ENDDATE 2, meeting end time ENDTIME 2, etc. in the forwarded invitation 25 can also be generated through copying in the same way.

Further, the meeting identifier APPTUUID 2 can be identified as the forwarding of the meeting identifier APPTUUID 1, and/or the meeting subject SUBJECT 2 can be identified as the forwarding of the meeting subject SUBJECT 1. For example, it is possible to generate a new meeting identifier APPTUUID 2 and take the original meeting identifier APPTUUID 1 as a part of the new meeting identifier APPTUUID 2. For example, the original meeting identifier APPTUUID 1 is 123456, and the new meeting identifier APPTUUID 2 may be 123456-abcdefg.

Other entries in the forwarded invitation 25 can be input by the user. For example, the user can input meeting initiator CHAIR 2, compulsory meeting participant SENDTO 2, non-compulsory meeting participant COPYTO 2, and meeting content BODY 2 according to his particular requirements. For meeting location LOCATION 2, it can be determined whether it is regarded as an associated entry according to requirements. It can be either copied from the original meeting invitation 15 or entered by the user.

To generate the forwarded invitation 25, the associated entries therein can be obtained through copying, or the copied values can be further modified. For example, the meeting start date STARTDATE 2, meeting start time STARTTIME 2, meeting end date ENDDATE 2, or meeting end time ENDTIME 2 can be copied from the associated entries in the original meeting invitation 15, or the copied values can be further modified. As described herein, a calendar entries association table may be created for a meeting invitation and its corresponding forwarded invitation. The table contains the associations between the calendar entries of the meeting invitation and those of the corresponding forwarded invitation. It can be appreciated by a person skilled in the art that the association of corresponding meeting entries may be created in other ways.

For example, the start time of the meeting invitation is 10:00, and the end time is 11:00. When generating the associated forwarded invitation, one instance is to copy the start time and the end time of the original meeting invitation directly; while another instance is to add additional time to the original meeting invitation so that the participant of the forwarded invitation can prepare for the meeting or further discuss the meeting content. For example, the start time of the forwarded invitation can be set to the start time of the meeting invitation minus 30 minutes (10:00−30 min), and the end time of the forwarded invitation can be set to the end time of the meeting invitation plus 30 minutes (11:00+30 min).

In this way, when receiving an update to the original meeting invitation, if the start time is changed to 10:30, and the end time to 11:30, then an update to the forwarded invitation can be generated according to the calendar entries association table. In the update to the forwarded invitation, the start time is changed to 10:00, and the end time to 12:00. Moreover, in the update to the forwarded invitation, the whole of the original meeting invitation can be taken as an independent section in the content of the forwarded invitation, as shown in FIG. 2 as the original meeting invitation information in the content entry BODY 2 of the forwarded invitation 25. The original meeting invitation information is formed by copying entries in the original meeting invitation 15. These copied entries may comprise one or more of the entries in the original meeting invitation for display to the user. In generating the association between the forwarded invitation and the meeting invitation in Step S230 of FIG. 1, the original meeting invitation information in the content entry BODY 2 may be associated with entries of the original meeting invitation 15. In this way, the original meeting invitation information in the content entry BODY 2 may be updated according to the update to the original meeting invitation 15.

According to an embodiment of the present invention, when forwarding the meeting information, a new meeting invitation will be generated. The calendar system may automatically generate a new identifier as a unique identifier MESSAGEID of the forwarded invitation document in the system. The meeting initiator entry CHAIR may adopt the identifier of the meeting forwarder. The original meeting identifier APPTUUID and the meeting subject SUBJECT can be copied to the forwarded invitation or as a part of corresponding entries in the forwarded invitation. The start date and time STARTDATE/STARTTIME, end date and time ENDDATE/ENDTIME may be automatically copied to the new forwarded invitation. The above information is used in the calendar system as basic information of the meeting. The meeting forwarder may independently process the additional contents independent of the original meeting information, such as the compulsory meeting participant SENDTO, non-compulsory meeting participant COPYTO, and new meeting location LOCATION of the forwarded invitation. Correspondingly, the compulsory meeting participant, non-compulsory meeting participant, meeting initiator, meeting location, together with the original meeting content BODY, are copied to the meeting content of the forwarded invitation as a section of contents (ORGMEETINGINFO), and processed together with the new appended contents (APPENDMEETINGINFO) as the content of the forwarded invitation (BODY). In order to keep processing of an update synchronized with the original meeting content, this part keeps relative independence, and is processed in the forwarded invitation as an independent part (SECTION).

In order to generate the association between the original meeting invitation and its forwarded invitation, a calendar entries association table may be generated as follows.

| Unique Identifier | Original Meeting Invitation Document Identifier | Forwarded Invitation Document Identifier |
|---|---|---|

The Unique Identifier associates the original meeting invitation and the forwarded invitation. The Original Meeting Invitation Document Identifier uniquely identifies the meeting invitation document in the calendar system. The Forwarded Invitation Document Identifier uniquely identifies the forwarded invitation document in the calendar system.

The generation of the calendar entries association table will be described in detail, herein. A meeting invitation is received in the calendar system of the original meeting participant, for which the calendar system can generate a meeting invitation document identifier MESSAGEID, such as Calendar-00@ibm.com. In response to the user selecting to forward the meeting invitation, a forwarded invitation Calendar-01@ibm.com is generated. Accordingly, the calendar system may generate the following calendar entries association table (Table 1), to record the association between the original meeting invitation and its forwarded invitation.

TABLE 1 association table of calendar entries

| Unique Identifier | Original Meeting Invitation Document Identifier | Forwarded Invitation Document Identifier |
|---|---|---|
| 0000001 | Calendar-00@ibm.com | Calendar-01@ibm.com |

It can be appreciated by one skilled in the art that other ways may be adapted to generate the association between the original meeting invitation and its forwarded invitation, for example, with pointers.

Moreover, the forwarded invitation may be re-forwarded by its recipient. The above method may further comprise: the participant of the forwarded invitation, as shown in FIG. 1, generating a re-forwarded invitation with his calendar system; generating the association between the re-forwarded invitation and the forwarded invitation; and sending the re-forwarded invitation.

After forwarding many times, the calendar entries association table may be formed as follows:

TABLE 2 calendar entries association table

| Unique Identifier | Original Meeting Invitation Document Identifier | Forwarded Invitation Document Identifier |
|---|---|---|
| 000001 | Calendar-00@ibm.com | Calendar-01@ibm.com |
| 000002 | Calendar-01@ibm.com | Calendar-02@ibm.com |
| 000003 | Calendar-02@ibm.com | Calendar-03@ibm.com |
| ... | ... | ... |
| 00000N | Calendar-N-1@ibm.com | Calendar-N@ibm.com |

In this way, in response to an update to the original meeting invitation, updates to the multiple forwarded invitations can be generated sequentially according to the associations therebetween.

Moreover, a calendar entries association table between the original meeting invitation and its forwarded invitation may also be generated, to record associations between entries in the forwarded invitation and entries in the original meeting invitation, such as, copy, function, or other processing relations.

TABLE 3 association table A of calendar entries

| Unique Identifier | Original Meeting Invitation Entry | Forwarded Invitation Entry | Relation |
|---|---|---|---|
| 000001 | APPTUUID 1 | APPTUUID 2 | Copy |
| 000001 | SUBJECT 1 | SUBJECT 2 | Copy |
| 000001 | CHAIR 1 | CHAIR 2 | Input |
| 000001 | SENDTO 1 | SENDTO 2 | Input |
| 000001 | COPYTO 1 | COPYTO 2 | Input |
| 000001 | LOCATION 1 | LOCATION 2 | Copy |
| 000001 | STARTDATE 1 | STARTDATE 2 | Copy |
| 000001 | STARTTIME 1 | STARTTIME 2 | Copy |
| 000001 | ENDDATE 1 | ENDDATE 2 | Copy |
| 000001 | ENDTIME 1 | ENDTIME 2 | Copy |
| 000001 | BODY 1 | BODY 2 | Input+ Original Meeting Invitation Information |
| ... | ... | ... | |
| 00000N | | | |

Table 3 represents the relation of generating a forwarded invitation entry from an original meeting invitation entry. For example:

| 000001 | APPTUUID 1 | APPTUUID 2 | Copy |
|---|---|---|---| represents that APPTUUID 2 is obtained by copying APPTUUID 1. The unique identifier 000001 corresponds to the unique identifier in Table 2, which identifies that the original meeting invitation (Calendar-00@ibm.com) is associated with the forwarded invitation (Calendar-01@ibm.com).

Table 3 also represents that BODY 2 is obtained by user input and copying the

| 000001 | BODY 1 | BODY 2 | Input+ Original Meeting Invitation Information | original meeting invitation information, such as copying SUBJECT 1, CHAIR 1, SENDTO 1, COPYTO 1, LOCATION 1, STARTDATE 1, STARTTIME 1, ENDDATE 1, ENDTIME 1, and/or BODY 1. That is, the contents of the original meeting invitation are appended to the content entry BODY 2 in the forwarded invitation. If the content entry in the original meeting invitation includes an attachment (such as a demonstration document), the attachment can also be copied to the content entry BODY 2 in the forwarded invitation.

TABLE 4 calendar entries association table A

| Unique Identifier | Original Meeting Invitation Entry | Forwarded Invitation Entry | Relation |
| --- | --- | --- | --- |
| 000001 | APPTUUID 1 | APPTUUID 2 | Copy + Forwarding Identification |
| 000001 | SUBJECT 1 | SUBJECT 2 | Copy + Forwarding Identification |
| 000001 | CHAIR 1 | CHAIR 2 | Input |
| 000001 | SENDTO 1 | SENDTO 2 | Input |
| 000001 | COPYTO 1 | COPYTO 2 | Input |
| 000001 | LOCATION 1 | LOCATION 2 | Input |
| 000001 | STARTDATE 1 | STARTDATE 2 | Copy |
| 000001 | STARTTIME 1 | STARTTIME 2 | Copy – 30 minutes |
| 000001 | ENDDATE 1 | ENDDATE 2 | Copy |
| 000001 | ENDTIME 1 | ENDTIME 2 | Copy + 30 minutes |
| 000001 | BODY 1 | BODY 2 | Input+ Original Meeting Invitation Information |
| ... | ... | ... | |
| 00000N | | | |

The relation in Table 4 represents generation of a forwarded invitation entry from an original meeting invitation entry. For example:

| 000001 | APPTUUID 1 | APPTUUID 2 | Copy + Forwarding Identification | represents that APPTUUID 2 is obtained by copying APPTUUID 1 and appending forwarding identification. That is, APPTUUID 2 comprises the content of APPTUUID 1 and the appended content (forwarding identification).

Table 4 also represents:

| 000001 | SUBJECT 1 | SUBJECT 2 | Copy + Forwarding Identification | that SUBJECT 2 is obtained by copying SUBJECT 1 and appending forwarding identification. That is, SUBJECT 2 includes the content of SUBJECT 1 and the appended content (forwarding identification).

Table 4 further represents:

| 000001 | STARTTIME 1 | STARTTIME 2 | Copy – 30 minutes | that STARTTIME 2 is obtained by copying STARTTIME 1 and decreasing 30 minutes. That is, STARTTIME 2 includes the content of STARTTIME 1 and the appended content (decreasing 30 minutes).

Table 4 further represents:

| 000001 | ENDTIME 1 | ENDTIME 2 | Copy + 30 minutes |

ENDTIME 2 is obtained by copying ENDTIME 1 and increasing 30 minutes. That is, ENDTIME 2 includes the content of ENDTIME 1 and the appended content (increasing 30 minutes).

The association between the forwarded invitation and the meeting invitation can also be generated through the forwarded invitation document identifier and the meeting invitation document identifier. Alternatively, the association between the original meeting invitation 15 and the forwarded invitation 25 can be generated through the meeting identifier APPTUUID. For example, the association between the original meeting invitation 15 and the forwarded invitation 25 can be generated through the same or an associated meeting identifier APPTUUID.

Figure 3A:

FIGS. 3a and 3b illustrate the user interface of a forwarded invitation according to an embodiment of the present invention, in which one manager forwards a meeting invitation to the discussion of project A to two team leaders in his department, and asks the two team leaders to participate in the meeting. Also, an update method is set in the forwarded invitation to perform updates according to the original meeting invitation. That is, updating is performed based on an update to the original meeting invitation.

Figure 4:
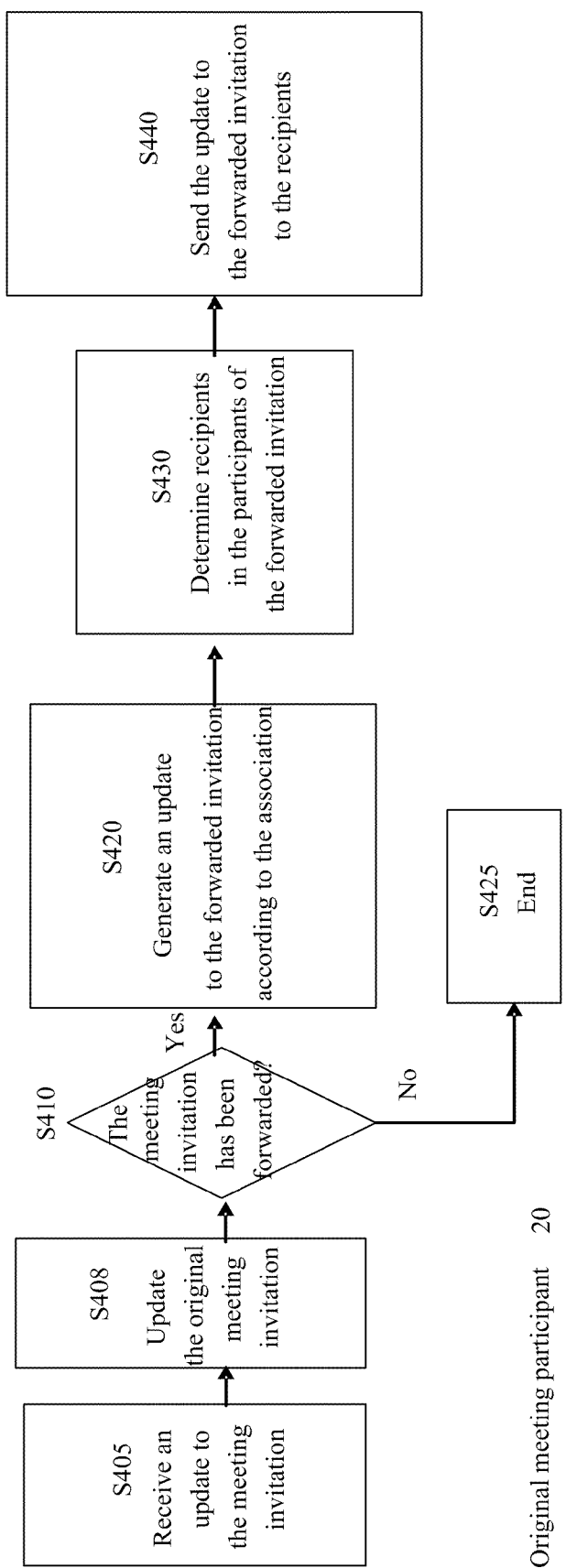
FIG. 4 illustrates a flowchart of updating a forwarded invitation according to another embodiment of the present invention.

FIG. 4 illustrates updating of a forwarded invitation according to another embodiment of the present invention. At Step S405, the original meeting participant 20 receives an update to a meeting invitation, for example, the meeting start time STARTTIME 1 (30 minutes earlier), meeting end time ENDTIME 1 (30 minutes earlier), and meeting content BODY 1 are updated. At Step S408, the original meeting invitation is updated. At Step S410, it is determined whether the meeting invitation has been forwarded by determining whether there is a forwarded invitation with an association. If there is a forwarded invitation with an association, it is determined that the meeting invitation has been forwarded, and Step S420 is performed; otherwise, Step S425 is performed, at which there is no further processing, and the flow ends. At Step S420, an update to the forwarded invitation is generated according to the association. For example, in the update to the forwarded invitation, the meeting start time STARTTIME 2 and meeting end time ENDTIME 2 are advanced 30 minutes accordingly, and the update to the meeting BODY 2 will reflect the update to the meeting start time STARTTIME 1, meeting end time ENDTIME 1, and meeting content BODY 1 of the original meeting invitation. At Step S430, the recipients of the forwarded invitation are determined according to accept and reject responses. At Step S440, the update to the forwarded invitation is sent to the above recipients.

Figure 5:
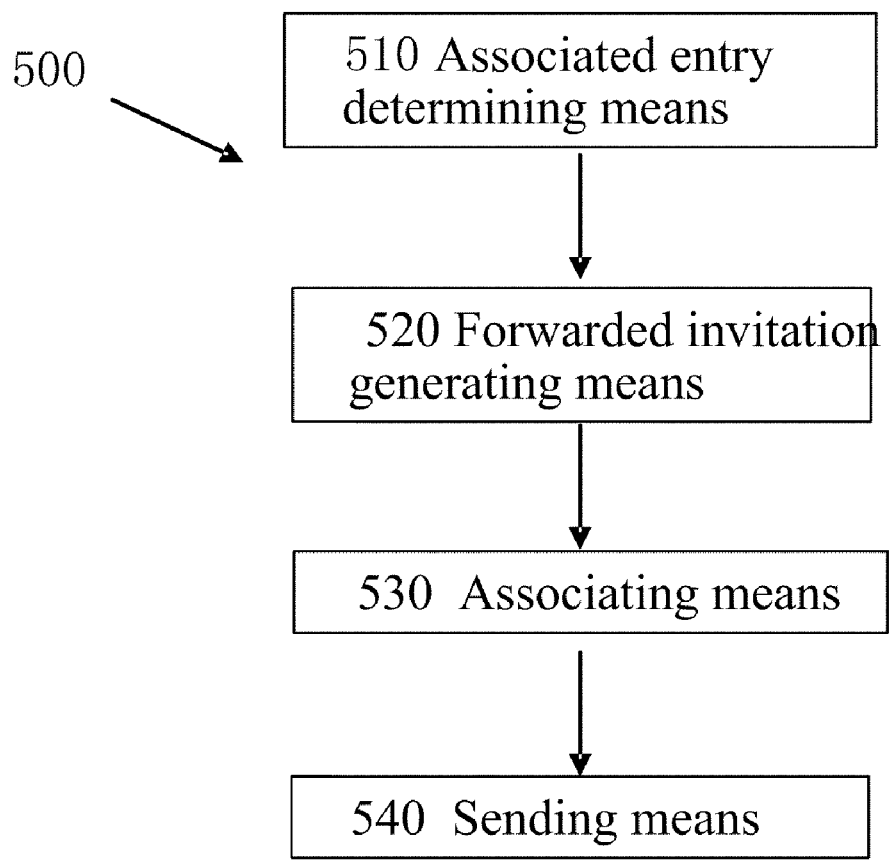
FIG. 5 illustrates a block diagram according to another embodiment of the present invention.

FIG. 5 illustrates a block diagram according to another embodiment of the present invention, in which a calendar system 500, comprises a plurality of means collaborating with each other as follows: associated entry determiner 510 for determining associated entries in a meeting invitation received in a calendar system; forwarded invitation generator 520 for generating a forwarded invitation according to the associated entries in order to forward the meeting invitation; associator 530 for generating an association between the forwarded invitation and the meeting invitation; and a sender 540 for sending the forwarded invitation.

In the calendar system 500, the associator 530 may be further configured to associate the forwarded invitation document identifier with the meeting invitation document identifier, and associate the entries in the forwarded invitation originated from the entries of the meeting invitation with the corresponding entries in the meeting invitation.

The calendar system 500 may further comprise an updater (not shown in FIG. 5) configured to, in response to receiving an update to the meeting invitation, generate an update to the forwarded invitation according to the association between the forwarded invitation and the meeting invitation; and the sender is further configured to send the update to the forwarded invitation.

In the calendar system 500, at least part of the entries in the forwarded invitation can be originated from the entries of the meeting invitation, while at least part of the entries in the forwarded invitation can be independent of the entries of the meeting invitation; the content of at least one entry originated from the meeting invitation comprises the content of an associated entry of the meeting invitation and appended contents.

The calendar system 500 may further comprise an updater (not shown in FIG. 5) configured to, independently of the meeting invitation, generate an update to the forwarded invitation with respect to the appended contents or the entries in the forwarded invitation independent of the meeting invitation; and the sender is further configured to send the update.

In the calendar system 500, the associated entry determiner 510 may be further configured to provide the entries of the meeting invitation, so that the user can select at least part of the entries as the associated entries for the forwarded invitation; and the forwarded invitation generating means 520 may be further configured to copy the associated entries in the meeting invitation to the forwarded invitation, and further set appended contents in the forwarded invitation.

In the calendar system 500, the sender may be further configured to send the forwarded invitation to the sender of the meeting invitation, so that he can update the meeting invitation according to the forwarded invitation. In this way, the original meeting invitation organizer can understand the status of meeting participants.

In the calendar system 500, the forwarded invitation generator 520 may be further configured to append the contents of the meeting invitation to the content entry of the forwarded invitation.

The calendar system 500 may further comprise a receiver for receiving a response from a recipient to accept or reject the forwarded invitation. The updater may be further configured to automatically forward the update to the meeting invitation to the recipients having accepted the forwarded invitation.

In the calendar system 500, the associated entry determiner may be further configured to, with respect to another forwarded invitation received in a calendar system, determine the associated entries in the other forwarded invitation; the forwarded invitation generator 520 may be further configured to generate a re-forwarded invitation according to the associated entries in the other forwarded invitation; the associator 530 may be further configured to generate an association between the re-forwarded invitation and the other forwarded invitation; and the sender 540 may be further configured to send the re-forwarded invitation.

The calendar system 500 may further comprise an updater, which, in response to receiving an update to the forwarded invitation, automatically generates an update to the re-forwarded invitation according to the association between the forwarded invitation and the re-forwarded invitation; and the sender 540 may be further configured to send the update to the re-forwarded invitation.

In this way, the forwarding and managing of meeting arrangements can be facilitated. According to a further embodiment of the present invention, the above method and calendar system for handling meeting invitations also provide distributed management of meeting arrangements that are relatively independent, so that meeting invitations and forwarded invitations can be managed and updated relatively independently.

The present invention also provides a storage medium or signal carrier, in which instructions for performing the method according to the present invention are included.

The flowchart and block diagram in the accompanying figures illustrate the architecture, functionality, and operations of possible implementations of the system, method and computer program product according to embodiments of the present invention. In this regard, each block in the flowchart or block diagram may represent a module, program segment, or a portion of code, which comprises one or more executable instructions for implementing the specified logical functions. It should also be noted that, in some alternative implementations, the functions noted in the blocks may occur in different order from that noted in the figures. For example, two blocks shown in succession may, in fact, be executed substantially concurrently, or the blocks may sometimes be executed in the reverse order, depending upon the functionality involved. It will also be noted that each block of the block diagram and/or flowchart, and combinations of blocks in the block diagram and/or flowchart, can be implemented by special purpose hardware-based systems that perform specified functions or operations, or by a combination of special purpose hardware and computer instructions.

The present invention has been described above in detail in conjunction with preferred schemes. However, it is apparent that the above embodiments are only illustrative, rather than limiting the present invention. Modifications can be made to the solutions of the present invention by a person skilled in the art, without departing from the scope and spirit of the present invention.

What is claimed is:

1. A method of handling meeting invitations in a calendar system, comprising:
    creating a meeting invitation to an original meeting participant in a calendar system of a meeting originator;
    determining, with a processor, associated entries in said meeting invitation received in a calendar system of said original meeting participant;
    in said calendar system of said original meeting participant, generating a forwarded invitation to a forwarded invitee according to the associated entries, and adding a document identifier of said meeting invitation to said forwarded invitation;
    sending said forwarded invitation to said forwarded invitee;
    in response to receiving an update to said meeting invitation in said calendar system of said original meeting participant, generating a corresponding update to said forwarded invitation; and sending said corresponding update to said forwarded invitee.

2. The method of claim 1, further comprising sending said forwarded invitation to said meeting originator.

3. A system for handling meeting invitations in a calendar system, comprising:

a processor; and memory connected to the processor, wherein the memory is encoded with instructions and wherein the instructions when executed comprise:

instructions for creating a meeting invitation to an original meeting participant in a calendar system of a meeting originator;

instructions for determining associated entries in said meeting invitation received in a calendar system of said original meeting participant;

in said calendar system of said original meeting participant, instructions for generating a forwarded invitation to a forwarded invitee according to the associated entries, and instructions for adding a document identifier of said meeting invitation to said forwarded invitation;

instructions for sending said forwarded invitation to said forwarded invitee;

in response to receiving an update to said meeting invitation in said calendar system of said original meeting participant, instructions for generating a corresponding update to said forwarded invitation; and instructions for sending said corresponding update to said forwarded invitee.

4. The system of claim 3, further comprising instructions for sending said forwarded invitation to said meeting originator.

5. A computer program product for handling meeting invitations in a calendar system, the computer program product comprising a hardware computer readable storage medium having computer readable program code embodied therewith, the computer readable program code comprising:

computer readable program code configured to create a meeting invitation to an original meeting participant in a calendar system of a meeting originator;

computer readable program code configured to determine associated entries in said meeting invitation received in a calendar system of said original meeting participant;

computer readable program code configured to generate a forwarded invitation according to the associated entries to a forwarded invitee;

in said calendar system of said original meeting participant, computer readable program code configured to generate a forwarded invitation to a forwarded invitee according to the associated entries, and computer readable program code configured to add a document identifier of said meeting invitation to said forwarded invitation;

computer readable program code configured to send said forwarded invitation to said forwarded invitee;

in response to receiving an update to said meeting invitation in said calendar system of said original meeting participant, computer readable program code configured to generate a corresponding update to said forwarded invitation; and computer readable program code configured to send said corresponding update to said forwarded invitee.

6. The computer program product of claim 5, further comprising computer readable program code configured to send said forwarded invitation to said meeting originator.

* * * * *